April 7, 1936.　　　　R. J. KEHL　　　　2,036,734
WELDING AND CUTTING APPARATUS
Filed Nov. 23, 1931　　　　2 Sheets-Sheet 1
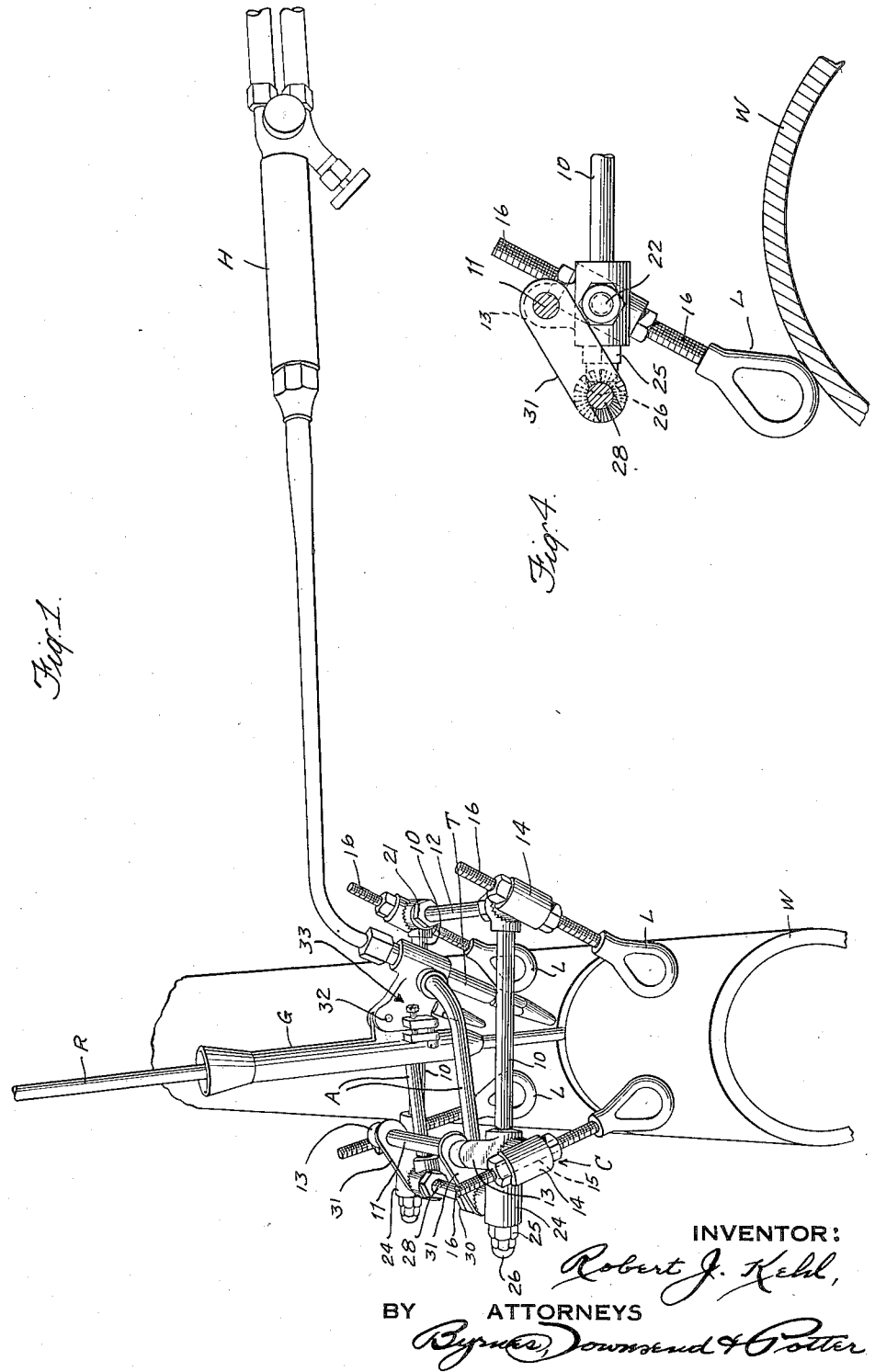
INVENTOR:
Robert J. Kehl,
BY ATTORNEYS
Byrnes Townsend & Potter

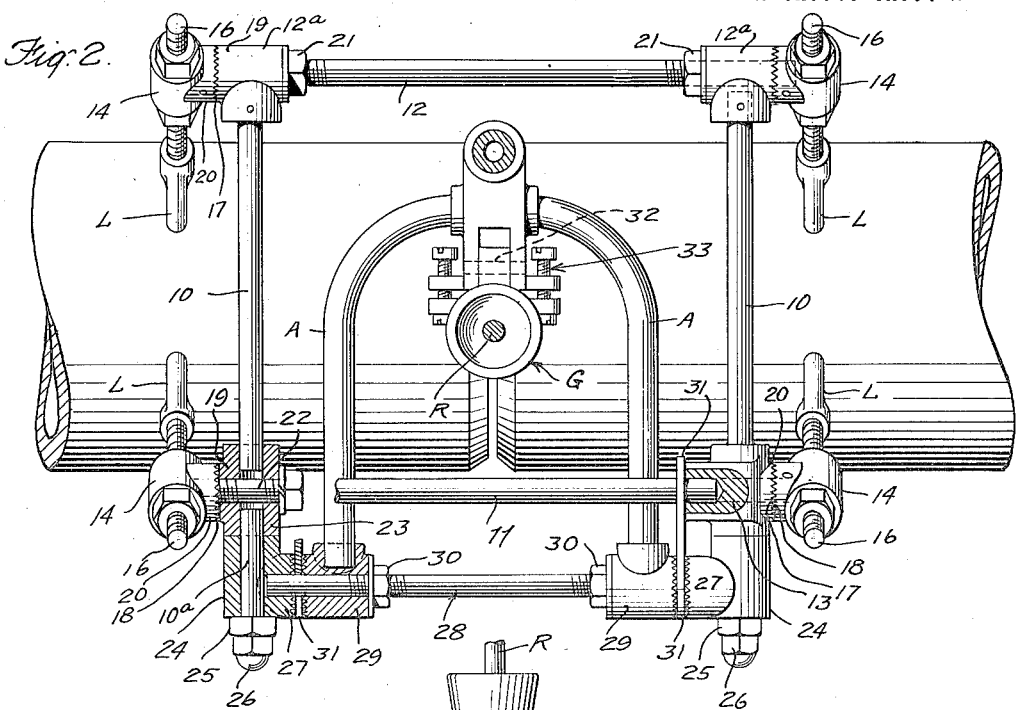
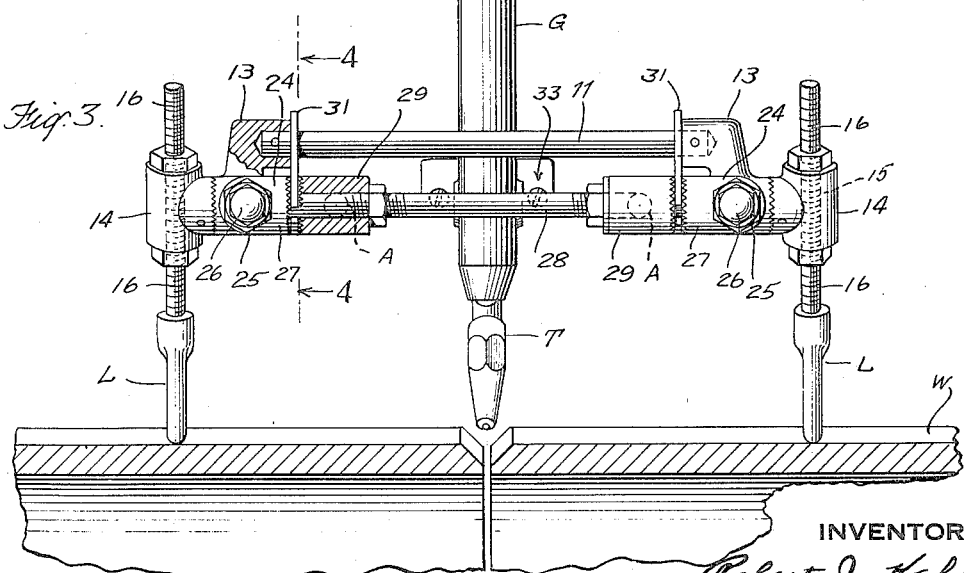

Patented Apr. 7, 1936

2,036,734

UNITED STATES PATENT OFFICE 2,036,734

WELDING AND CUTTING APPARATUS

Robert J. Kehl, Bayside, N. Y., assignor, by mesne assignments, to Union Carbide and Carbon Corporation, a corporation of New York Application November 23, 1931, Serial No. 576,895

22 Claims. (Cl. 113—59)

The present invention relates to apparatus for providing heat at high temperature on a portion of a metallic work surface as in the welding, cutting, deseaming, surfacing or other like processes in which there is relative movement between the work and the heat applying apparatus. The invention is especially applicable to welding or cutting apparatus, more particularly of the kind for use in hand welding of seams between metallic members or for severing metal and to apparatus of this character provided with supporting means adapted to rest on the work surfaces while being drawn thereover in welding a seam or in cutting.

It is an important object of this invention to provide in hand welding apparatus, improved supporting means which is adjustable to various contours of work surface and to curvatures, in such surfaces, of various diameters; which may be adapted to support the apparatus upon the work surface in stable equilibrium regardless of its contour; and, in which apparatus, the position of the pivotal axis about which the heating unit is rotated, in manipulation thereof during a welding operation, is unchanged by the adaptation of the supports to such variations in surface contour.

In accordance with the present invention, the welding apparatus may comprise a welding torch to which a suitable arm or arms are rigidly connected so as to project rearwardly therefrom and to the rear end of which, is pivotally connected, a carriage which extends forwardly from the pivotal point. The carriage is provided with suitable supports connected therewith for angular and axial adjustment and preferably located forwardly and rearwardly of the torch in such positions relatively thereto as to support the carriage in stable equilibrium regardless of any adjustment of the supports relative to the carriage. This carriage may be in the nature of an attachment so that the same can be disconnected from the apparatus when it is desired to employ the latter for operations which do not require the apparatus to be supported in stable equilibrium on work.

The above and other objects and novel features of the invention will be apparent from the following description taken with the accompanying drawings in which;

Fig. 1 is a perspective view illustrating a machine embodying this invention;

Fig. 2 is a plan view of the same on an enlarged scale as compared with Fig. 1; certain of the parts being shown in section;

Fig. 3 is a view of the same in rear elevation; certain of the parts shown in section;

Fig. 4 is a detail view of a spacer shown in operative relation to parts of the apparatus.

While the principles of the invention are herein set forth as applied to welding apparatus, it is to be understood that the same are applicable, also, to cutting apparatus, and to other apparatus of a similar nature for applying heat at high temperatures to metallic work surfaces as in deseaming, surfacing and other such processes.

As shown, the improved welding apparatus may comprise a heating unit, as a torch T, with which, may be associated a rod guide G and from which are projected rearwardly suitable arms A comprising a main frame. The main frame is supported by a carriage C to which the rear ends of the arms A are pivoted adapting the arms for rotary movement about an axis through the pivotal points in manipulation of the torch T during a welding operation, the manipulation of the torch being accomplished through a handle H.

The carriage C extends forwardly from the pivot points and is provided with suitable supports, as legs L, connected therewith for axial and angular adjustment in order to adapt the same to various contours of work surface and to curvatures of various diameters. These legs should be of sufficient number to support the carriage in stable equilibrium. As shown, there are four of such legs arranged in transverse pairs on opposite sides of the torch, the pairs being located respectively forwardly and rearwardly of the torch and at a sufficient distance therefrom to be uninfluenced by the intense heat of the flame. With this arrangement the carriage will not be changed in position by manipulation of the torch and, when resting on a curved surface as a pipe, will straddle the same and prevent the apparatus from sliding away from the welding region. The carriage comprises a pair of parallel side bars 10 which are connected by forward and rearward cross bars 11 and 12; cross bar 12 being in the plane of the side bars and rotatably connected therewith and cross bar 11 being raised a short distance about the side bars by suitable supports 13 for a purpose which will hereinafter appear.

Pivotally secured to the side bars for rotation in vertical planes are bearing heads or nuts 14 having threaded bores 15 therethrough for the reception of the threaded shanks 16 of the legs or supports L. The threaded connection between the shanks 16 and the bearing heads or nuts 14 permits of individual axial adjustment of the legs relative to the bearing heads, and the angular mounting of the heads on the sub-carriage provides for angular adjustment of the legs. The heads 14 are held at any angle of adjustment by coacting clutching surfaces respectively on the side bars 10 and on the bearing heads as shown at 17, and 18; these surfaces being located on opposing ends of bosses 19 and 20 respectively on the rods and bearing heads. The rod 12 is journaled in heads 12a secured to the forward ends of rods 10 and bearing heads 14 with which the forward legs are connected are secured to the rod 12 for rotation therewith. These forward heads 14 are held in their various positions of angular adjustment by engagement between the clutch surfaces on bosses 19 and 20 under influence of nuts 21 threaded on the rod. The heads with which the rearward legs are connected are secured to the ends of bolts 22 extending through transverse bores in members 23 secured to and forming enlargements of the side bars.

The side bars 10 have members 10a extending rearwardly from the enlargements 23 beyond the cross bar 11 which members are provided with threaded ends adapted to be projected through the bearing heads 24 constituting a part of the equipment of the main frame of the apparatus. The side bars are connected to the heads 24 by nuts 25 against which finishing nuts 26 are threaded to cover the threaded ends of the bars 10 and protect them against becoming clogged with slag and the like. These bearing heads 24 have lateral bosses 27 secured to the ends of the rod 28 and journaled in the heads 29 on the ends of the arms A. The opposing ends of boss 24 and of heads 29 are provided with cooperating clutching surfaces adapted, when the present apparatus is used without the carriage as an attachment, to be brought into engagement by means of nuts 30 for holding the heads 24 and the legs carried thereby in various positions of angular adjustment. In using the apparatus with the carriage as a part thereof, no such clutching function is desired and, on the contrary, free rotation of the main frame about the rod 28 is essential to the effectiveness of the apparatus in welding. In consequence, suitable spacers 31 are provided such, as shown in Fig. 4, pivoted to the bar 11 and provided with kerfs adapted to receive therein the bar 28. The spacers are slidable lengthwise of the bar 11 so that their kerfed ends may be readily brought to position between the ends of heads 29 and bosses 27 thereby preventing engagement of the clutch surfaces thereon.

The guide tube G for the rod R may be adjustably secured by pivot 32 to the torch and push and pull means 33 may be provided for holding the tube in various positions of angular adjustment to the torch.

In operation, the apparatus is dragged over the surface of the work toward the operator as in back hand welding; the runners on the lower ends of the legs L supporting the carriage C in stable equilibrium and, when working on curved surfaces, straddling the same and thereby preventing any sliding of the apparatus other than that intentionally effected under control of the welder. The torch may be manipulated up and down to control the condition of the welding puddle by rocking the torch and handle about the bar 28 as an axis and in so doing the manipulating leverage for the torch will not be varied by any adjustment of the legs relative to the carriage. In the arrangement as herein disclosed, it will be noted that the pivotal connecton between the torch and carriage is located rearwardly of the torch and is distinct from and preferably located in spaced relation to and rearwardly of and above the points of contact between the runners and the work. It will also be understood that the inventive improvements may be embodied in mechanism for use in other processes involving heat treatment as in deseaming or surfacing. The angle through which the handle may be rotated is limited by the cross bar 11 under which the arms A extend; this rod also serving to prevent a too great downward swing of the carriage when the apparatus is lifted off of the work.

When it is desired to use the apparatus with a contour of work for which the main frame is particularly constructed, the carriage C may be disconnected from the main frame by withdrawing the ends of the side bars 10 from the heads 24. The shanks of runners may then be threaded into the bores thereof and the heads 24 suitably adjusted and their clutch faces locked with those of the heads 29 by means of nuts 30 whereupon apparatus is provided having two runners L which provide two points of support, the handle H being adapted to be grasped by an operator to manipulate the torch and provide a third point of support for the apparatus.

While the improvements disclosed herein are shown as applied to hand-operable welding apparatus, it will be understood that they may be incorporated in machine welding apparatus as well as in other types of blowpipe apparatus such as both hand and machine operable gaseous cutting apparatus.

I claim:

1. In apparatus of the character described, the combination of heating means for providing heat at high temperature on a work surface; and a carriage adapted to rest in stable equilibrium on work with a sliding contact therewith; said heating means being flexibly connected to said carriage and freely movable with respect to the latter to enable the heating means to be moved to and from the work during the application of heat thereto.

2. In apparatus of the character described, the combination of heating means for providing heat at high temperature on a work surface; and a carriage adjustable to various contours of work surface; said heating means being flexibly connected to said carriage and freely movable with respect to the latter to enable the heating means to be moved to and from the work surface during the application of heat thereto.

3. In welding apparatus, the combination of heating means for providing welding heat at a welding point; a carriage; supports for the carriage; means permitting adjustment of the supports relatively to the carriage; means affording a flexible connection between the heating means and carriage; and means for manipulating the heating means about said connection.

4. In apparatus of the character described, the combination of heating means for providing heat at high temperature on a work surface; a carriage connected with the heating means; supporting means on said carriage adapted frictionally to contact and slide along the work and positioned forwardly and rearwardly of the heating means when the heating means is in operative position; said supporting means being adjustable with respect to the carriage.

5. In apparatus of the character described, the combination of heating means for providing heat at high temperature on a work surface; and a carriage, said heating means being flexibly connected to said carriage and freely movable with respect to the latter; and non-rotary supporting means on the carriage including members adapted frictionally to contact and slide along the work surface.

6. In welding apparatus, the combination of heating means for providing welding heat at the welding point; a carriage so positioned relative to the heating means as to straddle the work in the region of the welding point when the heating means is in welding position; a member extending rearwardly from the carriage; a member extending rearwardly from the heating means; and a flexible connection between the rear ends of said members.

7. In welding apparatus, the combination of heating means and means for directing a welding rod to a welding point; a carriage including a frame and legs adjustably secured thereto in positions forwardly and rearwardly of the heating means; and members on the heating means pivoted to the carriage rearwardly of the heating means.

8. In welding apparatus, the combination of heating means for providing welding heat at a welding point; supports for the heating means located forwardly and rearwardly thereof; and means providing a pivotal connection between the heating means and supports rearwardly of the heating means to enable the heating means to be moved to and from the work during welding.

9. In welding apparatus, the combination of heating means for providing welding heat at a welding point; a main frame rigid therewith and extending therefrom; a carriage adapted to be supported in stable equilibrium on work and having means pivotally connected with the extended end of the main frame to permit movement thereof during welding; said carriage having supports angularly adjustable relative thereto.

10. In welding or cutting apparatus, the combination of means for directing a gaseous jet upon work, a carriage, and means for supporting said carriage in stable equilibrium on the work, such jet directing means being flexibly connected to said carriage and freely movable with respect to the latter to permit said jet directing means to be moved to and from the work during welding or cutting.

11. In apparatus of the character described, a carriage adapted to rest in stable equilibrium on work; jet directing means flexibly connected with the carriage so as to be free to oscillate about the flexible connection; and means for manipulating the jet directing means to and from the work about the flexible connection.

12. In apparatus of the character described, the combination of a carriage; jet producing means supported thereby and movable to and from the work during the application of heat thereto; and means connected with the carriage forwardly and rearwardly of the jet producing means to support the apparatus in stable equilibrium on the work surface; said supporting means being axially adjustable relative to the carriage.

13. In apparatus of the character described, the combination of a carriage and heating means for providing a high heat; supports connected to said carriage for angular and axial adjustment positioned to support the carriage in stable equilibrium on work; and a flexible connection between the carriage and heating means to permit movement of the latter to and from the work during the application of heat.

14. In apparatus of the character described, the combination of a welding or cutting member; a carriage supporting said member; said carriage having supports connected thereto adapted frictionally to contact and slide along the work surface and positioned on opposite sides of said member so as to support the carriage in stable equilibrium on a work surface; said supports being adjustable to position the apparatus properly on work surfaces of various curvatures.

15. In apparatus of the character described, the combination of a welding or cutting member; a carriage supporting said member; said carriage having supports connected thereto adapted frictionally to contact and slide along the work surface and positioned on opposite sides of said member so as to support the carriage in stable equilibrium on a work surface; said supports being axially and angularly adjustable to position the apparatus properly on work surfaces of various curvatures and to different levels of said work surfaces on opposite sides of said welding or cutting member.

16. In apparatus of the character described, the combination of heating means for providing high temperatures in work surfaces; a carriage pivotally connected therewith and adapted to rest in stable equilibrium on a work surface; and means on said carriage positioned with respect to the pivotal connection so as to permit limited angular movement of the heating means relative to the carriage and to serve as a stop to limit downward movement of the carriage when the apparatus is lifted off of the work surface.

17. In apparatus of the character described, the combination of a carriage and a heat producing member for providing high temperatures on work surfaces; said member having a main frame pivotally connected with the carriage and detachable therefrom; and supporting means interchangeably connectible with the main frame and carriage.

18. In apparatus of the character described, the combination of a main frame and a member connected therewith for angular adjustment relative thereto; means for locking said member in various positions of angular adjustment; a carriage and supports interchangeably connectible with said member; and means for preventing the locking means from functioning when the carriage is connected with the member.

19. In apparatus of the character described, the combination of heating means for providing high temperatures on work surfaces, and a carriage provided with supporting members having the extreme ends thereof adapted frictionally to contact and slide along the work, said heating means being pivotally connected to said carriage and freely movable with respect to the latter, such pivotal connection being disposed at a point spaced from said heating means and permitting movement thereof to and from the work surface during the application of heat.

20. In apparatus of the character described, the combination of a heating unit for providing a high degree of heat on a work surface and a carriage provided with supporting members having the extreme ends thereof adapted frictionally to contact and slide along the work surface for supporting the heating unit; said heating unit being pivotally connected to said carriage and freely movable with respect to the latter to permit movement of the heating unit to and from the work during the application of heat thereto; said pivotal connection being spaced from the contact of the supports with the work.

21. In apparatus of the character described, the combination of heating means for providing heat at high temperature on a metallic work surface; a carriage; supports for the carriage; means permitting adjustment of the supports to the carriage; means affording a flexible connection between the heating means and carriage; and means for manipulating the heating means about said connection.

22. In apparatus of the character described, the combination of heating means for providing heat at high temperature on a metallic work surface; a main frame rigid therewith and extending therefrom; a carriage adapted to be supported in stable equilibrium on work and having means pivotally connected with the extended end of the main frame; said carriage having supports angularly adjustable relative thereto.

ROBERT J. KEHL.